May 21, 1946.  G. ALTHOFF  2,400,622
DEVICE FOR THE HYDRAULIC TRANSMISSION OF POWER
Filed Dec. 21, 1944  3 Sheets-Sheet 1

INVENTOR
George Althoff

May 21, 1946.  G. ALTHOFF  2,400,622
DEVICE FOR THE HYDRAULIC TRANSMISSION OF POWER
Filed Dec. 21, 1944  3 Sheets-Sheet 2
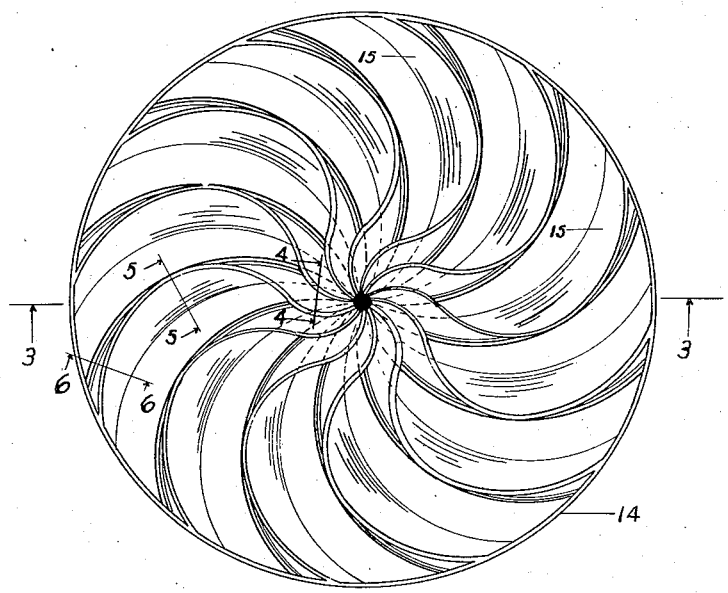
Fig. 2
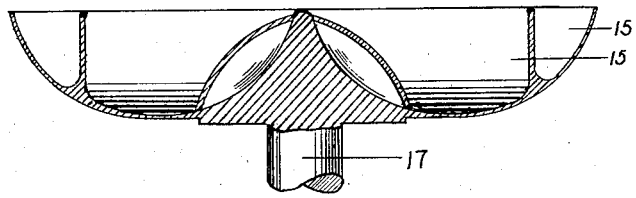
Fig. 3
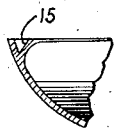   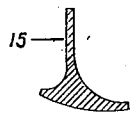   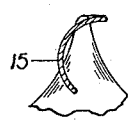
Fig. 6  Fig. 5  Fig. 4
INVENTOR
George Althoff Patented May 21, 1946

2,400,622

UNITED STATES PATENT OFFICE 2,400,622

DEVICE FOR THE HYDRAULIC TRANSMISSION OF POWER

George Althoff, Los Angeles, Calif.

Application December 21, 1944, Serial No. 569,232

1 Claim. (Cl. 60—54)

This invention relates to improvements in devices for the hydraulic transmission of power, and refers particularly to the type in which a bladed member attached to a driven shaft comprising the impeller member or rotor rotates within a stationary closed casing containing fluid, the bladed portion of said rotor being so formed as to force the fluid by centrifugal force against a second bladed member attached to a shaft comprising the impelled member or rotor in such manner as to rotate said impelled rotor whereby rotation is imparted to a shaft.

The objectives of this invention are:

The provision of means to develop a continuous cylindrical circuitous circulation of the fluid medium through a path of minimum impedance intercepted by means whereby the direction of flow of the fluid is deflected at will to an angle to the general line of the current flow;

To provide such a device wherein the torque exerted on a driven shaft may be varied from zero to a maximum through means of a directional fluid control member through which the fluid passes in its cylindrical circuitous course from the impeller rotor to the impelled rotor without varying the speed of rotation of the impeller rotor;

To provide such a device wherein the direction of rotation of the impelled rotor may be reversed independently of the direction of rotation of the impeller rotor and with means of protecting the mechanism of the device against sudden and extreme strains in the process of reversing the direction of rotation of the impelled rotor.

To provide the means of complete immediate positive responsive control of all moving parts of the directional fluid control member directly from one contact point of control impulse external the stationary case member with complete freedom from the movements of the impeller and impelled rotors;

To provide means whereby two primary positions of adjustment of the directional fluid control member can be made permitting discretion of immediate control of forward or reverse rotation of the impelled rotor from an idle condition and with the facility of the revolvable shutter vanes of said control member obtain greatest flexibility of intermediate adjustments in the manipulation and control of the device to the discretion of the operator;

To provide a device of the class described that may be constructed for a relatively low cost with a high factor of safety in operation that is quiet and efficient in performance and economical to use, and, that its compactness and simplicity affords easy adaptation to universal application as a separate power conversion unit as described or as a component part in a combination of power transmission;

The foregoing and other objects and advantages of the invention will appear as the following description is read in connection with the accompanying drawings.

In the drawings:

Fig. 2 is a view of the bladed driving member looking toward the bladed side;

Fig. 3 is a cross-sectional view of the same taken on line 3—3 of Fig. 2;

Fig. 4 is a cross-sectional view of one of the blades taken on line 4—4 of Fig. 2;

Fig. 5 is the same as Fig. 4, except it is taken on line 5—5 of Fig. 2;

Fig. 6 is the same as Fig. 4, except it is taken on line 6—6 of Fig. 2;

Figure 1:
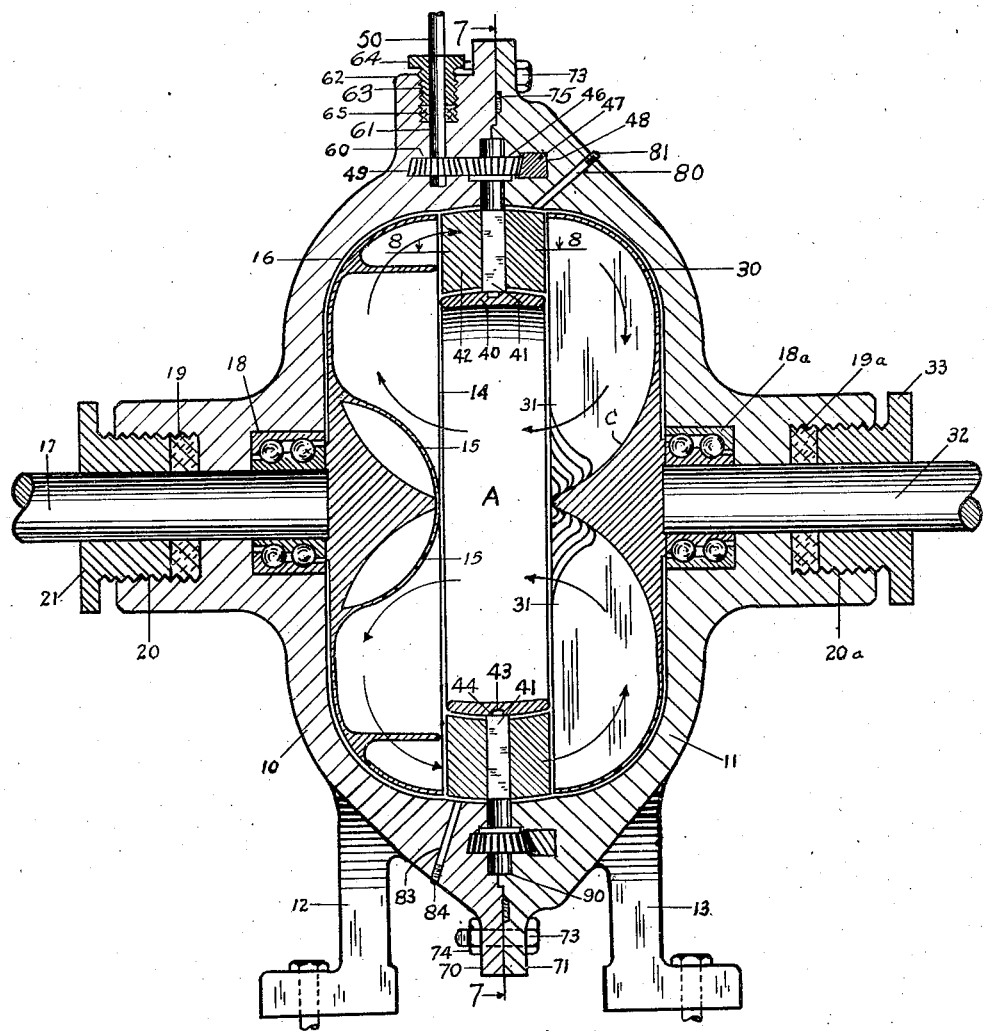
Figure 1 is a central, longitudinal, cross-sectional view of the device comprising this invention.
Figure 8:
Fig. 8 is a cross-sectional view of one of the shutter vanes taken on line 8—8 of Fig. 1.
Figure 7:
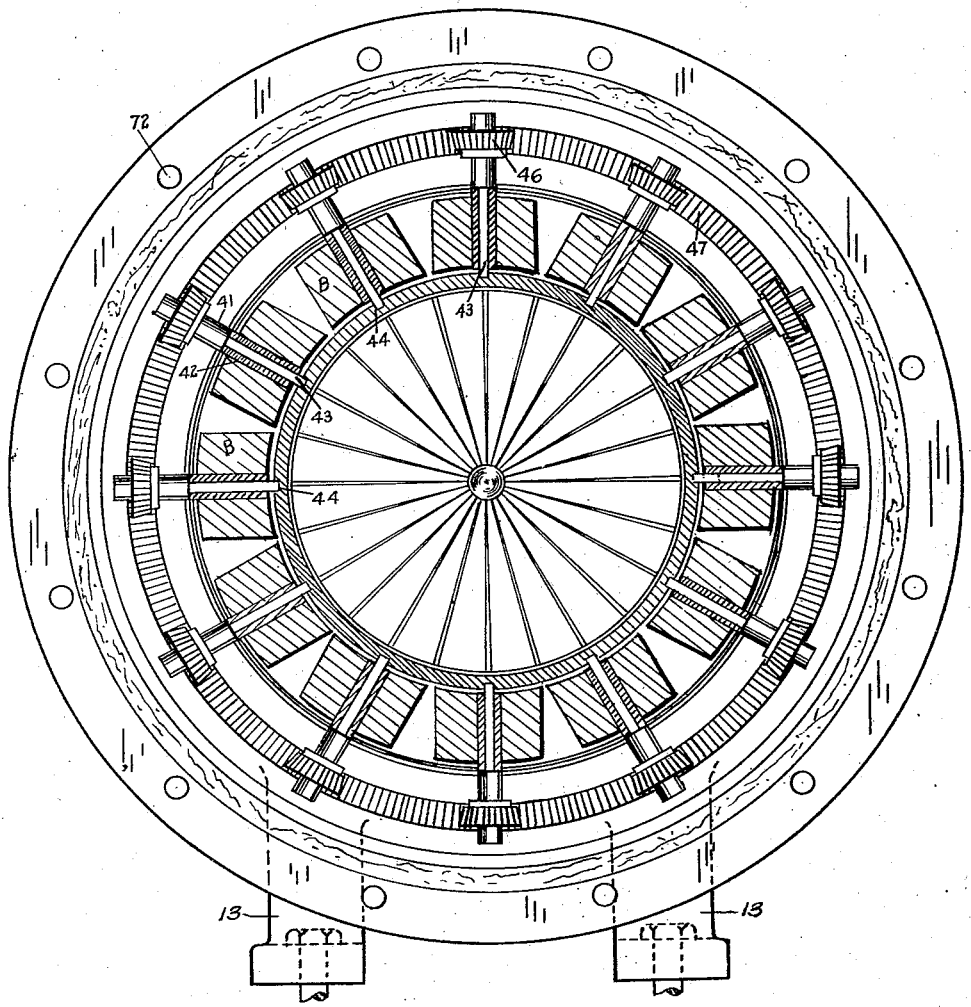
Fig. 7 is a view of the device taken on line 7—7 of Fig. 1.

Referring to Figure 1 it will be seen that the improved device comprises a case composed of two similar members 10 and 11 supported by legs 12 and 13 respectively and becomes the stationary member, or stator of the device. Mounted in the member 10 is an impeller rotor member 14 said rotor member being hemispherical and cupped out from its center toward its edges in such manner as to form relatively thin curved impeller blades or fins 15 open at their top edges. As will be seen by reference to Figs. 2, 3, 4 and 5 these blades 15 start from a common center and extend outward in a curve in the direction of the rotation of the said member 14. It will be seen that the blades 15 are also curved cross-sectionally the concave side being on the impelling side of the blade. The closed side of the member 14 follows the contour of the case member 10 and it is desirable that only a very narrow space 16 be provided between the members 10 and 14 in order to maintain clearance in movement.

While in Fig. 1 only a relatively limited portion of the hemispherical rotor member 14 is shown as flattened it is to be understood that the relative portion flattened may be increased if found desirable as would be the case in the event that a device of large size were to be built. A suitable opening, not identified, to receive a driving shaft 17, a bearing 18, and a packing gasket 19, is provided through the case member 10. The outer portion of said opening has threads 20 which receive a nut 21. The shaft 17 is held in position longitudinally by any means commonly used for that purpose and it may be connected to any source of driving power found satisfactory such as an electric motor. The member 14 is shown as being integral with the shaft 17, but the two could be separate and of different material and joined in any satisfactory manner and such a construction is within the contemplation of this invention.

Mounted in the member 11 is a rotor member 30 said rotor member being mounted in the member 11 in like manner as the member 14 is mounted in the member 10. The member 30 is of the same general construction as that of the member 14 except the blades 31 have flat sides and extend radially and are cut away for a substantial depth in the area adjacent the central portion. The member 30 and its shaft 32 are integral but if found desirable may be separate and joined in any manner found satisfactory. A packing gasket 19a is held in position by a nut 33 and the shaft 32 running in bearing 18a is held in longitudinal position by any means found satisfactory. This shaft 32 is also connected in any conventional manner to mechanism which it is to drive. By reference to Fig. 1 it will be seen that a directional fluid flow control member comprising a ring shutter mechanism is operatively attached to and becomes a part of the stationary case member of the device and consists of a ring 40 supported centrally in a fluid compartment A on pins 41. The inner surface of the ring 40 is shown slightly concave in shape but can be easily modified to conform to the fluid flow characteristics according to its size, and the opposite side is convex. The pins 41 are flat sided and have mounted on them intermediate the ring 40 and the members 10 and 11 shutter vanes 42 adapted to revolve and to direct the flow of fluid when the device is in operation. These pins 41 and vanes 42 are spaced equidistant around the ring 40 and form a series of gates B through which, in the operation of the device an activated fluid flows from the driving rotor member 14 to the driven rotor member 30. The inner end of the pin 41 terminates in a round reduced portion 43 adapted to turn in a socket 44 formed in the ring 40 to receive the said pin the inner end face of which is adaptable to the seat of socket 44 to support said ring 40. The pins 41 extend a substantial distance into and between the members 10 and 11 and thus obtain a fixed position and relation with the stationary member of the device, said pins having gear wheels 46 keyed to or otherwise fastened to their outer portion the teeth of said gear wheels meshing with the teeth of a gear ring 47 mounted in a groove 48 formed in the member 11. If found desirable the gears 46 may be made an integral part of the pins 41. The gear wheels 46 are actuated by means of a cooperating gear wheel 49 mounted on shaft 50. Recesses 60 are formed in the member 10 to receive the gear wheels 49 and 46. The shaft 50 has near its inner end a square portion or is otherwise formed so that when it enters a similarly shaped center hole in the gear wheel 49 the turning of the shaft 50 will cause the gear wheel to turn correspondingly. A hole 61 is bored in the embossed portion 62 of member 10 to receive the shaft 50 and to cooperate with recess 60. In this embossed portion 62 is a threaded recess 63 adapted to receive a nut 64 which holds a packing 65 in position. The members 10 and 11 are formed with flanges 70 and 71, respectively, each with bolt holes 72 which cooperate to receive bolts 73 whereby with nuts 74 members 10 and 11 are bolted together. A packing or gasket 75 is held between the members 10 and 11 to prevent leakage of fluid. An intake hole 80 is provided with thread adapted to receive a threaded plug 81. Similarly a fluid outlet hole 83 provided with thread is adapted to receive a threaded plug 84. Simplicity of design allows wide discretion of operating fluid used according to the operating conditions prevailing and therefore the device is not limited to any specific liquid or fluid.

In operation the device may be set in neutral position in starting or it may be set in forward or reverse position. The driving or impelling rotor member 14 is driven in a counterclockwise rotation facing the open side of said member. As the impeller is driven in fluid the fluid which lies between the blades 15 will be thrown by centrifugal force along the curved faces of those blades toward the outer periphery of said member emerging from between said blades through the gates B into the member 30 and after expending its driving force against blades 31 it flows toward the center of said member 30, along the gradual slope C toward and into the center chamber A where it is again caught between the blades 15 to begin another cycle of circulation. The course of fluid circulation during the operation of the device is indicated by arrows in Fig. 1. The outside longitudinal arc and outside circumferential arc of ring 40 have the same radius and are concentric as shown in Fig. 1, hence the outside surface of the ring is spherical. Because similar relations exist with the inner concave and circumferential arcs of the casing members 10 and 11 at their point of juncture and they too are concentric respectively with ring 40 it is evident the space between the ring 40 and casing members 10 and 11 is bounded by spherical surfaces. Hence, the vanes 42 with their concave and outer convex curvatures conforming respectively to adjacent surfaces of the ring 40 and members 10 and 11 and pivoted centrally on radial axes therebetween are free to revolve in either direction of motion. Thus, in consequence of no limitations by design to the free circular movement of shaft 50, gears 49 and 46, pins 41, vanes 42 and ring gear 47, except by their interlocking cooperative relations as shown, it is obvious that all such parts are free to revolve in either direction of rotation responding solely and entirely to the revolving action of shaft 50 which protrudes externally through the stationary casing member 10 as shown in Fig. 1 where control impulse is initiated.

If operation is to be started in neutral position the shaft 50 is turned by any external mechanism found adaptable until the vanes 42 are held in a position so that fluid passing between them will be thrown with equal force against both lateral faces of the blades 31 and thus member 30 is not actuated in either direction. To start the driven or impelled rotor member 30 forward the vanes 42 are turned at an angle to deflect the fluid passing between them in a direction to strike against only one face of the blades 31 thus causing the rotor 30 to revolve in opposite direction from the face of the blades against which the fluid pressure strikes. The angle at which the fluid strikes these faces may be changed through adjustment of the shutter vanes 42 from an angle of 0 degrees to an angle approaching 90 degrees as a limit. Therefore it will be obvious that with a given speed of rotation of the impeller rotor the force directed in one direction against the member 30 can be changed from none to its maximum without intermediate steps. To change the angle of the vanes 42 the shaft 50 is rotated which in turn rotates the gear wheel 49 whose teeth mesh with the teeth of one of the gear wheels 46 whose teeth in turn mesh with the teeth of the ring gear 47. The gear teeth of the ring 47 mesh with each of the wheels 46, accordingly, to manipulate the shutter vanes 42 the gear ring 47 is rotated in either direction by rotating shaft 50.

To reverse the direction of rotation of the impelled rotor 30 the vanes 42 are turned gradually in reverse to and through their neutral position until the fluid strikes against the opposite lateral faces of blades 31.

Because the shutter vanes 42 can revolve they can be rotated in either direction to and through two extreme angular relations with the rotor 30. When gates B are open and vanes 42 have no angular direction against the blades 31 the fluid is not deflected and strikes both lateral faces of the blades and results in braking action, or, non-rotation of rotor 30. When gates B are closed and vanes 42 are in 90 degree relation with blades 31 rotor 30 is without braking action and directional fluid power.

It is apparent that with gates B closed vanes 42 can be rotated directly in either direction and cause rotor 30 to revolve in the desired direction. However, if rotor 30 is revolving at high speed due to momentum or other obvious reason vanes 42 can be rotated to direct the fluid flow in agreement with the rotation of rotor 30 and bring it under control, or, if desired, vanes 42 can be rotated directly from the closed position to cause the fluid flow in opposition to the rotation of rotor 30 and thus apply immediate braking action and subsequent reversal of rotor 30 without passing in reverse through changes from high speed high power condition to a stop position or reverse rotation of rotor 30.

Factors here made obvious and claimed to comprise the nucleus of this invention follow: The simplicity of design, control, operation, and application of the device. The simple facility of attachment of direct control of the device and of the device to service. The complete independence of movements of functional members of the directional fluid control means from movements of the impeller and impelled rotors. The flexibility of discretionary manipulation of the revolvable control vanes in either direction through the maximum range of movements actuated from a stationary contact point external the device.

Shaft 50 protruding externally at embossment 62 provides a simple and convenient attachment means and affords easy adaptation of manual or automatic control methods for operation, speed regulation or rotation reversal, or each in combination, whichever the user of the device may require.

The use of gears as means of transmitting the control impulse from shaft 50 to pins 41 is discretional. Other common means, for example, a disk with a ball-pin on its face and a connecting crank link assembly could be substituted for the gears used and obtain full compliance with all requirements and references of the gears made herein. However, the gears are shown here as a preferred mechanical adaptation of commonly employed principles because they are the simplest, require fewer parts, are easiest and cheapest to fabricate, most readily adaptable, most practical and logical of common means employed for such functions. It is therefore obvious that the novelty of this newly introduced feature of the device described is not limited to the use of gears.

While the device has been shown in the form of a floor model it is to be understood that the invention contemplates forming and adapting the device to work in connection with machinery of all types which may be found practical. Obviously the device can be modified by the addition, removal or substitution of parts and such modification do not depart from the spirit of the invention.

While I have shown the blades 15 and 31 as integral parts of the members 14 and 30, respectively, it is to be understood that they may be removably attached to said members and that if found desirable the blades 15 may be made to curve oppositely from that shown in Fig. 2 and the direction of rotation of the rotor member 14 may be reversed.

While the invention has been described in one particular form variations may be employed without departing from the spirit of the invention, and it is therefore intended that the scope of the invention be not limited by said arrangement, nor any more than may be required by the following claim.

I claim:

A device of the class described for the hydraulic transmission of power, comprising a stationary casing containing fluid and having mounted in said casing an impeller member and an impelled member, said impeller and impelled members being mounted on shafts in opposed relation and having mounted between the outer peripheral portion of said members directional fluid control means and means for operating the directional fluid control means, said casing consisting of two members held in bolted relation with a gasket therebetween whereby leakage of fluid from between the members of the casing is prevented, said casing members having formed in their registering edge portions recesses which cooperate to receive and retain directional fluid control means supporting pins and also to receive gear wheels mounted and supported on said pins, one of said casing members also being recessed to receive a gear wheel and a revolvable shaft whereby said latter gear wheel may be revolved in mesh with one of the above referred to gear wheels, and the other of said casing members having its said recess sufficiently deep to receive a ring gear whose teeth mesh with the teeth of each of the said gear wheels mounted on said pins whereby rotation of said revolvable shaft will impart a revolving motion to said pins; said impeller member consisting of a shaft mounted in suitable bearings and a hemispherical portion cupped out from its center toward its edges forming relatively thin curved impeller blades the concaved surface of said blades being on the impelling side of the blades, said curved impeller blades starting from a common center and extending outwardly to the periphery of the impeller member in a curved direction and extending in depth to the bottom of the hemispherical portion also in a curved direction the top edges of said impeller blades and the top of the said common center portions being substantially in the same plane; said directional fluid control means consisting of a ring mounted on pins which extend a relatively short distance into the fluid containing compartment of said casing, a shutter vane mounted on each of said pins and adapted to turn with the pin so as to present the edges of said vanes to fluid being forced toward said directional fluid control means or so as to present one or the other side of the vanes to said fluid whereby the direction of the flow of said fluid is controlled as may be desired by an operator; control means for said shutter vanes consisting of an actuating shaft and a gear wheel carried thereon meshed with a gear wheel mounted on one of the said pins the teeth of this latter gear wheel meshing with the teeth of a gear ring whose teeth mesh with the gear teeth of each gear wheel mounted on each of said pins whereby said vanes may be revolved in synchronism; said impelled member consisting of a shaft mounted in suitable bearings and a hemispherical portion cupped out from its center toward its edges forming relatively thin straight blades said blades being substantially cut away at their inner portions; whereby power from an impeller member is transmitted to and impels a member through fluid means the fluid traveling in a cylindrical circuitous path intercepted by means whereby the direction of the flow is deflected at will to an angle to the general line of current flow.

GEORGE ALTHOFF.